June 4, 1957  A. J. PIEL  2,794,422
LIQUID APPLICATOR FOR ANIMAL USAGE
Filed June 28, 1956
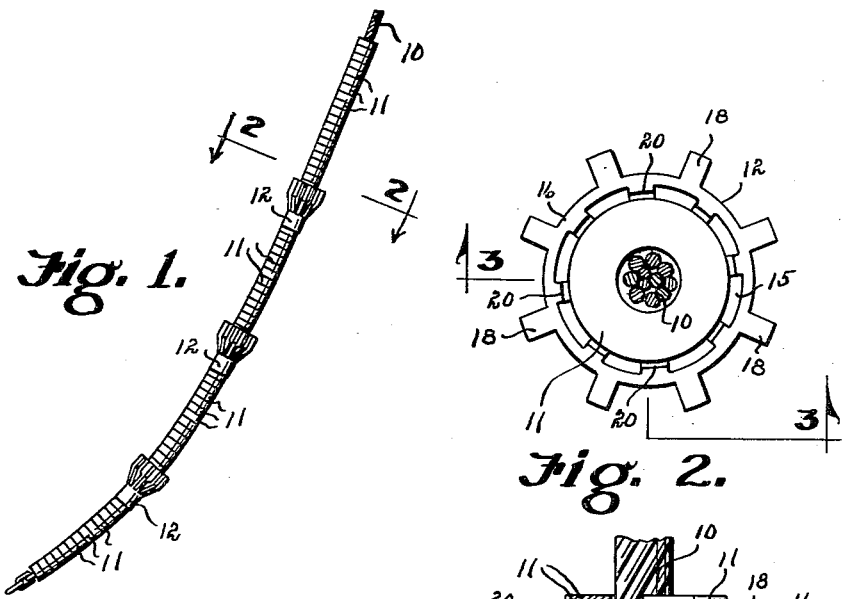
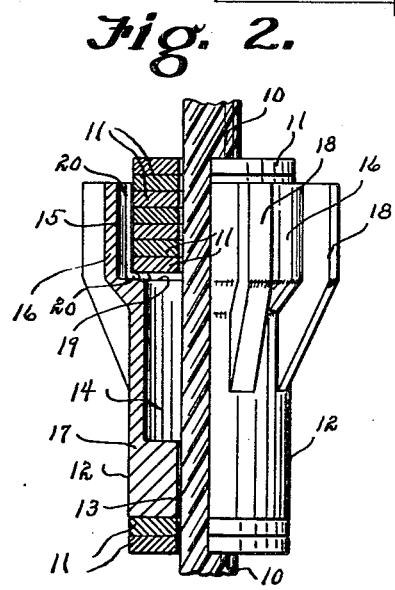
Witness.
A. G. Martin
INVENTOR.
A. J. Piel.
BY
M. Talbert Dick
ATTORNEY

United States Patent Office 2,794,422
Patented June 4, 1957

2,794,422

LIQUID APPLICATOR FOR ANIMAL USAGE

Alfred J. Piel, Hubbard, Iowa

Application June 28, 1956, Serial No. 594,421

9 Claims. (Cl. 119—157)

This invention relates to devices used in animal husbandry and more particularly to an animal oiler used in conjunction with equipment for the treatment of the hair and skin of animals.

Especially in the raising of cattle, the outside of the animal is often treated to make the hair oily and brilliant. If an oil is used, the skin of the animal is also treated and greatly benefited. Often the solutions used prevent skin diseases, and eliminates parasites such as ticks, flies, and like. Some effort has been made to provide rubbing cables saturated with the liquid treatment wherein the animal will rub or scratch itself on the cable and thereby distribute the liquid treatment over its body. One of the chief problems with such equipment is the continuous saturating of the cable so that when the animal uses the rubbing cable, it will rub off on its hide sufficient liquid to obtain the desired results. The prior art has solved the continuous supply phase. However, two additional problems developed. First, little if any liquid arrived at the lower end portion of the cable and, secondly, the round washers around the cable did not dig into the animal hair to reach the surface skin of the animal, nor did they effectively scratch the animal to dislodge parasites.

Therefore, one of the principal objects of my invention is to provide rotatable liquid applicators for use on a cable having washers that conserve and direct the liquid from one end area of the cable to the other end area of the cable.

A further object of this invention is to provide a rotatable applicator for use on cables that has projections on its periphery for animal hair penetration thereby acting both as a liquid applicator direct to the skin of the animal and as a scratch means to relieve itching and to remove parasites.

A further object of my invention is to provide an animal liquid applicator that once set up requires little if any attention from the stockman.

Still further objects of this invention are to provide a ridged spool liquid applicator for cables that is economical in manufacture, durable in use, and refined in appearance.

These and other objects will be apparent to those skilled in the art.

My invention consists in the construction, arrangements, and combination of the various parts of the device, whereby the objects contemplated are attained as hereinafter more fully set forth, pointed out in my claims, and illustrated in the accompanying drawings, in which:

Fig. 1 is a fragmentary side view of my device in use.

Fig. 2 is an enlarged top plan view of one of the spool units taken on line 2—2 of Fig. 1.

Fig. 3 is a side sectional view of one of the spool units taken on line 3—3 of Fig. 2 and more fully illustrates its construction.

In these drawings I have used the numeral 10 to designate an oil applicator cable having a plurality of rotatable washers 11. As is well known such cables extend downwardly and outwardly, are fastened at top and bottom and are supplied with a liquid such as lotions, medicated chemicals, oils and like, at their upper ends. This liquid runs down the cable and seeps outwardly between the washers 11. To redirect the liquid back to the cable proper so that a supply will be available substantially throughout the length of the cable I have provided a funnel spool applicator for spaced use on the cable and which I will now describe in detail.

I have used the numeral 12 to generally designate my liquid redirecting unit. In each spool unit 12 are three connecting bores, i. e. a lower end bore 13, an intermediate bore 14, and an upper end bore 15 as shown in Fig. 3. The bore 13 is of a diameter substantially that of the holes in the washers 11 and only slightly larger than that of the diameter of the cable 10. The diameter of the bore 14 is greater than that of the bore 13. The diameter of the bore 15 is greater than that of the diameters of the washers 11, and of a diameter greater than that of the bore 14. The spool unit 12 is elongated and its outside upper diameter 16 is greater than that of its central and lower diameter 17. On the outside of the spool unit are a plurality of spaced apart radially extending longitudinal fins 18. These fins 18 extend from the top of the spool unit downwardly over the area 16, thence downwardly and inwardly onto the spool area 17 as shown in Fig. 3. By the bore 15 being greater than that of the bore 14, a shoulder 19 is produced at the top of the bore 14. The numeral 20 designates spaced ridges extending downwardly on the inner wall of the bore 15 and inwardly over the shoulder 19 as shown in Fig. 2 and Fig. 3. As herebefore indicated I impose in spaced relationships a plurality of these spool units 12 on the cable 10 with the washers 11 holding the units in spaced arrangement as shown in Fig. 1. Any spaced arrangement may be had merely by selecting the number of washers between any two spool units.

When my spool units are installed on a cable some of the washers 11 will rest in the cup bore 15, but will be held in spaced relationships to the inside wall of the bore 15 and above the shoulder 19 by the ridges 20. This construction provides passageways for the surplus liquid from the peripheries of the washers to pass into the bore reservoir 14. By the upper portion of the spool unit being in the form of a cup, it will funnel this liquid downwardly and inwardly toward the cable. Thus the direction of seepage of the liquid from the cable outwardly between the washers to the peripheries of the washers, is reversed by one of my spool units. The liquid will pass from the bore 14 inwardly onto the cable, thence on the cable through the bore 13, and then again work itself outwardly between the washers below such spool unit. Therefore, with the use of my spool units, the liquid will pass intermittently downwardly and outwardly and inwardly and downwardly thereby maintaining the liquid supply from one end of the cable to its other end area. The fins 18 also serve a useful purpose in applying the liquid into the hair of the animal and also directly to the skin. These fins penetrate or part the hair of the animal and also act as scratching means for the removal of parasites and like from and in the skin of the animal. The bore 15 is an open well for receiving the washers and to provide this capacity the upper end portion of the unit is enlarged, with the lower end portion of the spool unit having a diameter substantially that of the diameter of the washers.

Some changes may be made in the construction and arrangement of my liquid applicator for animal usage without departing from the real spirit and purpose of my invention, and it is my intention to cover by my claims, any modified forms of structure or use of mechanical

I claim:

1. A liquid applicator for animals comprising a cable adapted to be supported at its ends in an inclined relation with respect to the ground, said cable having intermediate its length at least one liquid redirecting unit, and washer-like means on said cable in engagement with opposite sides of said unit to hold said unit against movement along said cable.

2. The structure of claim 1, wherein said redirecting unit comprises a spool having an open well at one end thereof receiving a portion of said washer-like means therein, and a communicating bore rotatably embracing said cable.

3. The structure of claim 2, wherein ridges are provided on the inner wall of said well for holding said washer-like means out of contact with the inner wall of said spool unit.

4. The structure of claim 3, wherein fins are provided on the outer surface of said spool unit.

5. A liquid applicator for animals comprising a cable adapted to be supported at its ends in an inclined relation with respect to the ground, said cable having intermediate its length at least one liquid redirecting spool unit comprising an elongated body member having an enlarged upper portion and a lower portion, a bore in said lower portion embracing said cable, an open well in said enlarged upper portion communicating with said bore and having a diameter greater than said bore, and washer-like means on said cable in engagement with opposite sides of said unit to hold said unit against movement along said cable.

6. The structure of claim 5, and spaced fins on the outer surface of said body member.

7. A liquid applicator for animals comprising a cable adapted to be supported at its ends in an inclined relation with respect to the ground, said cable having intermediate its length at least one liquid redirecting spool unit comprising an elongated body member having upper and lower end portions and a central portion, a bore in said lower end portion adapted to embrace said cable, a bore in said central portion communicating with and having a diameter greater than that of the diameter of said first mentioned bore, a third bore in said upper portion communicating with said second mentioned bore and having a diameter greater than that of the diameter of said second mentioned bore, and washer-like means on said cable in engagement with opposite sides of said unit to hold said unit against movement along said cable.

8. The structure of claim 7, wherein said lower end portion has an outside diameter less than that of the inside diameter of said third bore.

9. The structure of claim 8, and radial fins on the outer surface of said body member.

References Cited in the file of this patent

UNITED STATES PATENTS

| | | |
|---|---|---|
| 1,031,400 | Tirrill | July 2, 1912 |
| 2,583,300 | Marcussen | Jan. 22, 1952 |
| 2,757,945 | Bingham | Mar. 7, 1956 |